United States Patent
Hsu et al.

(10) Patent No.: US 11,405,649 B2
(45) Date of Patent: Aug. 2, 2022

(54) SPECIFYING SLICE CHUNKS OF A SLICE WITHIN A TILE

(71) Applicant: MEDIATEK INC., Hsinchu (TW)

(72) Inventors: Chih-Wei Hsu, Hsinchu (TW); Lulin Chen, San Jose, CA (US); Chun-Chia Chen, Hsinchu (TW); Yu-Ling Hsiao, Hsinchu (TW); Yu-Wen Huang, Hsinchu (TW); Ching-Yeh Chen, Hsinchu (TW); Tzu-Der Chuang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/178,134

(22) Filed: Feb. 17, 2021

(65) Prior Publication Data

US 2021/0258613 A1 Aug. 19, 2021

Related U.S. Application Data

(60) Provisional application No. 63/002,410, filed on Mar. 31, 2020, provisional application No. 62/993,750, (Continued)

(51) Int. Cl.
*H04N 19/70* (2014.01)
*H04N 19/174* (2014.01)
(Continued)

(52) U.S. Cl.
CPC ........... *H04N 19/70* (2014.11); *H04N 19/119* (2014.11); *H04N 19/174* (2014.11); *H04N 19/184* (2014.11)

(58) Field of Classification Search
CPC .... H04N 19/70; H04N 19/119; H04N 19/184; H04N 19/174
See application file for complete search history.

(56) References Cited

U.S. PATENT DOCUMENTS

2021/0204000 A1* 7/2021 Wang ................. H04N 19/436
2021/0218965 A1* 7/2021 Li ......................... H04N 19/70

FOREIGN PATENT DOCUMENTS

| CN | 103947207 A | 7/2014 |
| CN | 104160702 A | 11/2014 |

(Continued)

OTHER PUBLICATIONS

Taiwanese Office Action dated Apr. 25, 2022 in Taiwanese Application No. 110105529, 6 pgs.

*Primary Examiner* — Tat C Chio
(74) *Attorney, Agent, or Firm* — Oblon, McClelland, Maier & Neustadt, L.L.P.

(57) ABSTRACT

A video system that partitions slices of video pictures into slice chunks is provided. A video decoder receives data from a bitstream to be decoded as a current picture of a video. When a first syntax element in a picture parameter set (PPS) of the current picture indicates that one or more slices of the current picture are allowed to be divided into multiple slice chunks and when a second syntax element in a slice header of a current slice of the current picture indicates that data of the current slice is encoded and delivered in two or more slice chunks, the video decoder parses and specifies sizes and positions of the slice chunks of the current slice and reconstructs the current picture based on the slice chunks of the current slice.

14 Claims, 8 Drawing Sheets

Related U.S. Application Data filed on Mar. 24, 2020, provisional application No. 62/983,785, filed on Mar. 2, 2020, provisional application No. 62/977,822, filed on Feb. 18, 2020.

(51) Int. Cl.
*H04N 19/184* (2014.01)
*H04N 19/119* (2014.01)

(56) References Cited

FOREIGN PATENT DOCUMENTS

| | | | |
|---|---|---|---|
| TW | 201524192 A | 6/2015 | |
| WO | WO-2020179713 A1 * | 9/2020 | ........... H04N 19/174 |

* cited by examiner

SPECIFYING SLICE CHUNKS OF A SLICE WITHIN A TILE

CROSS REFERENCE TO RELATED PATENT APPLICATION(S)

The present disclosure is part of a non-provisional application that claims the priority benefit of U.S. Provisional Patent Applications No. 62/977,822 filed on 18 Feb. 2020, No. 62/983,785 filed on 2 Mar. 2020, No. 62/993,750 filed on 24 Mar. 2020, and No. 63/002,410 filed on 31 Mar. 2020. Contents of above-listed applications are herein incorporated by reference.

TECHNICAL FIELD

The present disclosure relates generally to video coding. In particular, the present disclosure relates to methods of signaling slices in a video picture.

BACKGROUND

Unless otherwise indicated herein, approaches described in this section are not prior art to the claims listed below and are not admitted as prior art by inclusion in this section.

High-efficiency video coding (HEVC) is an international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

A coded picture can be represented by a collection of slices, each slice having an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A coded picture may also be divided into independent, rectangular regions called tiles. The different tiles are logically independent so they can be processed in parallel by video encoders or decoders, thereby improving coding efficiency.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video system that partitions slices of video pictures into slice chunks. A video decoder receives data from a bitstream to be decoded as a current picture of a video. When a first syntax element in a picture parameter set (PPS) of the current picture indicates that one or more slices of the current picture are allowed to be divided into multiple slice chunks and when a second syntax element in a slice header of a current slice of the current picture indicates that data of the current slice is contained and delivered in two or more slice chunks, the video decoder parses and specifies sizes and positions of the slice chunks of the current slice and reconstructs the current picture based on the slice chunks of the current slice. Each slice chunk is contained and delivered in a different NAL unit.

In some embodiments, the size of a slice chunk is specified in the bitstream as a number of rows of CTUs that are in the slice chunk. In some embodiments, a syntax element in the slice header indicates whether a particular slice chunk is a first slice chunk that is coded in the current slice. In some embodiments, a syntax element in the slice header specifies an address of a particular slice chunk by identifying a CTU row in the tile that includes the current slice. In some embodiments, syntax elements in the bitstream identify a CTU that corresponds to the start of a particular slice chunk and a CTU that corresponds to the end of the particular slice chunk.

In some embodiments, the current slice is partitioned into multiple tiles. If the current slice is not a rectangular slice, a slice address of the current slice is specified by identifying a particular tile in the slice in that a slice address of the current slice is derived and specified by adding a number of tiles in a slice to an address of a previously coded slice.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
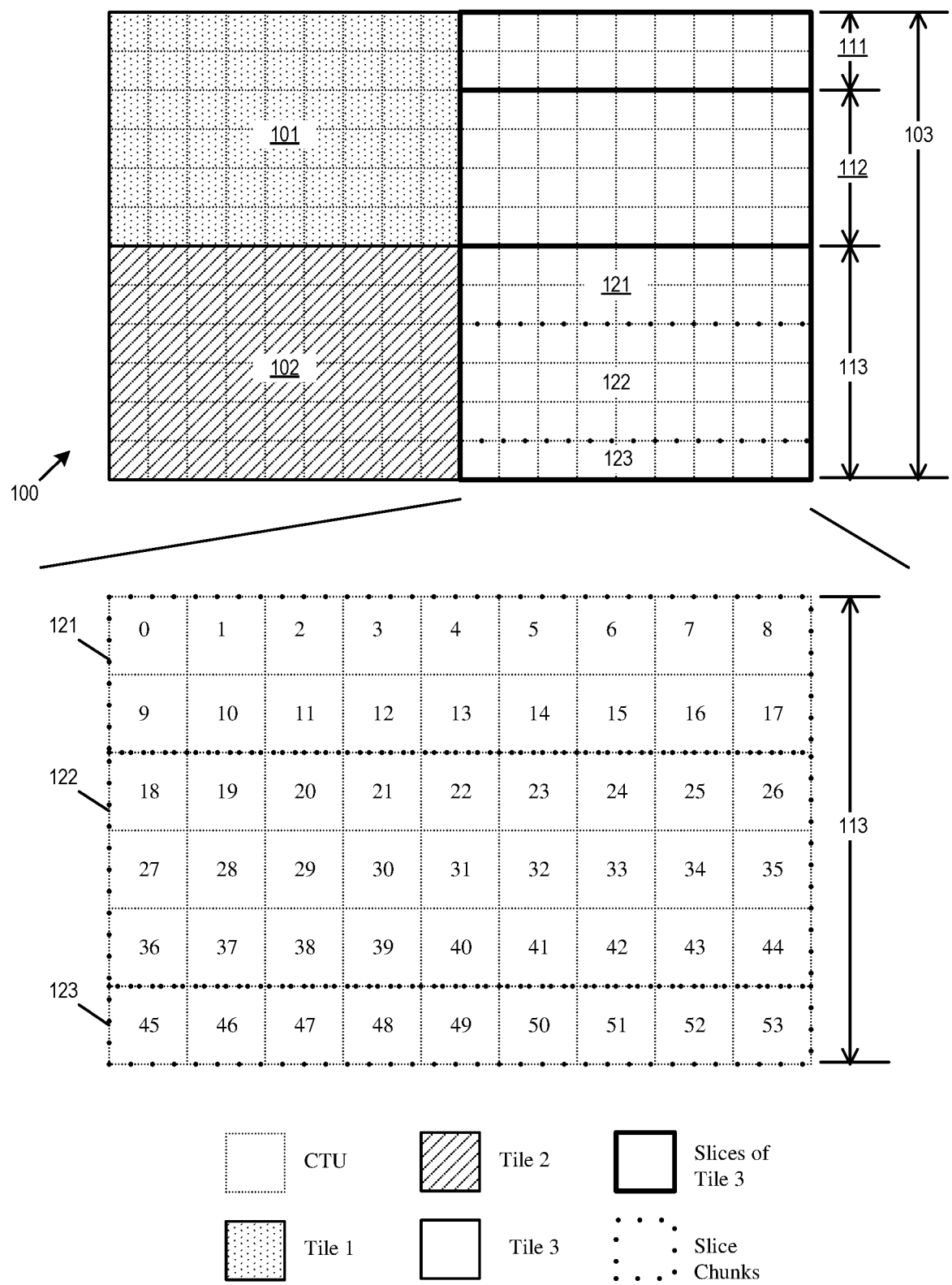
FIG. 1 illustrates slice chunks in a slice within a tile of a picture. In the figure, the dash lines show boundaries of the slice chunk.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Tiles and Slices

A slice can be an integer number of complete tiles or an integer number of consecutive complete CTU rows within a tile of a picture that are exclusively contained in a single Network Abstraction Layer (NAL) unit. The single NAL unit size is the size for output and delivery (to network or storage) after encoding. In general, using smaller slice sizes risks lowering coding efficiency while using larger slice sizes risks increasing processing delay and negatively affect low latency applications.

In some embodiments, structures of tiles and rectangular slices are specified in a picture parameter set (PPS) of a video picture. Table 1 below is an example syntax table for PPS that includes tile and slice syntax structure, for both uniform and non-uniform tile columns and rows for the slice layout specification.

TABLE 1

| PPS that includes tile and slice syntax structure | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
| ... | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |

TABLE 1-continued

PPS that includes tile and slice syntax structure

| | Descriptor |
|---|---|
|     for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|             slice_height_in_tiles_minus1[ i ] == 0 ) { | |
|             num_slices_in_tile_minus1[ i ] | ue(v) |
|             numSlicesInTileMinus1 = num_slices_in_tile_minus1[ i ] | |
|             for( j = 0; j < numSlicesInTileMinus1; j++ ) | |
|                 slice_height_in_ctu_minus1[ i++ ] | ue(v) |
|         } | |
|         if( tile_idx_delta_present_flag && i < num_slices_in_pic_minus1 ) | |
|             tile_idx_delta[ i ] | se(v) |
|     } | |
|     } | |
|     loop_filter_across_tiles_enabled_flag | u(1) |
|     loop_filter_across_slices_enabled_flag | u(1) |
| } | |
|     entropy_coding_sync_enabled_flag | u(1) |
| ... | |
|     picture_header_extension_present_flag | u(1) |
|     slice_header_extension_present_flag | u(1) |
|     pps_extension_flag | u(1) |
|     if( pps_extension_flag) | |
|         while( more_rbsp_data( )) | |
|             pps_extension_data_flag | u(1) |
|     rbsp_trailing_bits( ) | |
| } | |

A slice-in-tile video picture (or slice-in-tile case) is a video picture in which tiles are partitioned into slices. In some embodiments, for rectangular slices in the slice-in-tile picture, the layout of the slices is also specified in the PPS applicable to the picture, while signaling or deriving only the slice height in units of CTUs since the slice width is the tile width. When the slice size is equal to the tile size, only the slice height in units of CTU is signaled since the width is the tile width.

II. Slice Chunk

For some embodiments of the disclosure, a slice chunk is a partial slice containing an integer number of consecutive complete CTU rows within a tile of a picture. A slice within a tile may be divided into more than one units in sequence. Such units can be referred to as "slice chunks" (or any other pre-defined naming). Each slice chunk is, like a slice, exclusively contained in a single NAL unit for delivery. The delivered NAL units of the slice chunks are then decoded sequentially.

In some embodiments, slice chunks in a slice within a tile of a picture are specified in decoding order. By allowing slices to be partitioned into slice chunks, the slice data of each slice can be delivered in smaller (NAL) units, which may help low latency video applications meet delay requirements, while the video content of the slice can be reconstructed based on the delivered slice data regardless of slice chunks.

FIG. 1 illustrates slice chunks in a slice within a tile of a picture. In the figure, the dash lines show boundaries of the slice chunk. As illustrated, a picture 100 includes tiles 101, 102, and 103. The tile 103 is divided into three slices 111, 112, and 113. The slices 111 and 112 have no slice chunks. The slice 113 is partitioned into slice chunks 121, 122, and 123. The data of the slice 113 is delivered in three NAL units that corresponds to the three slice chunks 121-123, but the slice data from all three chunks is encoded together as one slice 113.

A slice header is part of the slice that precedes the actual slice data. The slice header provides specific information for the decoding of the slice data, i.e., the coded CTUs within the picture to which the slice belongs. In some embodiments, each slice chunk of a slice has its own corresponding slice header and slice data. In some embodiments, the slice header has a flag to indicate whether the corresponding slice data is that of a complete slice or of a slice chunk, and if so, a flag to indicate whether the slice data is that of a first slice chunk in the slice.

Table 2A-C below shows syntax elements for signaling slice chunks.

TABLE 2A

PPS with flag to enable slice chunks

| | Descriptor |
|---|---|
| pic_parameter_set_rbsp( ) { | |
|     pps_pic_parameter_set_id | ue(v) |
|     pps_seq_parameter_set_id | u(4) |
|     mixed_nalu_types_in_pic_flag | u(1) |
|     pic_width_in_luma_samples | ue(v) |
|     pic_height_in_luma_samples | ue(v) |
|     pps_conformance_window_flag | u(1) |
|     if( pps_conformance_window_flag ) { | |
|         pps_conf_win_left_offset | ue(v) |
|         pps_conf_win_right_offset | ue(v) |
|         pps_conf_win_top_offset | ue(v) |
|         pps_conf_win_bottom_offset | ue(v) |
|     } | |
|     scaling_window_explicit_signalling_flag | u(1) |
|     if( scaling_window_explicit_signalling_flag ) { | |
|         scaling_win_left_offset | ue(v) |
|         scaling_win_right_offset | ue(v) |
|         scaling_win_top_offset | ue(v) |
|         scaling_win_bottom_offset | ue(v) |
|     } | |
|     output_flag_present_flag | u(1) |
|     subpic_id_mapping_in_pps_flag | u(1) |
|     if( subpic_id_mapping_in_pps_flag) { | |

TABLE 2A-continued

PPS with flag to enable slice chunks

|  | Descriptor |
|---|---|
| pps_num_subpics_minus1 | ue(v) |
| pps_subpic_id_len_minus1 | ue(v) |
| for( i = 0; i <= pps_num_subpic_minus1; i++ ) |  |
|     pps_subpic_id[ i ] | u(v) |
| } |  |
| pps_slice_chunk_enabled_flag | u(1) |
| no_pic_partition_flag | u(1) |
| if( !no_pic_partition_flag ) { |  |
|     pps_log2_ctu_size_minus5 | u(2) |
|     ... |  |
|     loop_filter_across_tiles_enabled_flag | u(1) |
|     loop_filter_across_slices_enabled_flag | u(1) |
| } |  |
| cabac_init_present_flag | u(1) |
| ... |  |
| pps_extension_flag | u(1) |
| if( pps_extension_flag ) |  |
|     while( more_rbsp_data( ) ) |  |

TABLE 2B

Slice header with flag to enable or disable slice chunks

|  | Descriptor |
|---|---|
| slice_header( ) { |  |
|   picture_header_in_slice_header_flag | u(1) |
|   if( picture_header_in_slice_header_flag ) |  |
|     picture_header_structure( ) |  |
|   if( subpic_info_present_flag ) |  |
|     slice_subpic_id | u(v) |
|   if( (rect_slice_flag && NumSlicesInSubpic[ CurrSubpicIdx ] > 1 ) \|\| ( !rect_slice_flag && NumTilesInPic > 1 ) ) |  |
|     slice_address | u(v) |
|   if( rect_slice_flag && pps_slice_chunk_enabled_flag ) { |  |
|     multi_slice_chunks_flag | u(1) |
|     if( multi_slice_chunks_flag ) { |  |
|       first_slice_chunk_in_slice_flag | u(1) |
|       num_ctu_rows_in_slice_chunk_minus1 | ue(v) |
|     } |  |
|   } |  |
|   for( i = 0; i < NumExtraPhBits; i++ ) |  |
|     sh_extra_bit[ i ] | u(1) |
|   if( !rect_slice_flag && NumTilesInPic > 1 ) |  |
|     num_tiles_in_slice_minus1 | ue(v) |
|   if( !multi_slice_chunks_flag \|\| multi_slice_chunks_flag && first_slice_chunk_in_slice_flag ) { |  |
|     ... |  |
|   } |  |
|   if( NumEntryPoints > 0 ) { |  |
|     offset_len_minus1 | ue(v) |
|     for( i = 0; i < NumEntryPoints; i++ ) |  |
|       entry_point_offset_minus1[ i ] | u(v) |
|   } |  |
|   if( slice_header_extension_present_flag ) { |  |
|     slice_header_extension_length | ue(v) |
|     for( i = 0; i < slice_header_extension_length; i++) |  |
|       slice_header_extension_data_byte[ i ] | u(8) |
|   } |  |
|   byte_alignment( ) |  |
| } |  |

TABLE 2C

Slice data of a slice chunk

|  | Descriptor |
|---|---|
| slice_data( ) { |  |
|   FirstCtbRowInSlice = 1 |  |
|   for( i = StartCtuNum; i < EndCtuNum; i++ ) { |  |
|     CtbAddrInRs = CtbAddrInCurrSlice[ i ] |  |
|     CtbAddrX = ( CtbAddrInRs % PicWidthInCtbsY ) |  |
|     CtbAddrY = ( CtbAddrInRs / PicWidthInCtbsY ) |  |
|     if( CtbAddrX = = CtbToTileColBd[ CtbAddrX ] ) { |  |
|       NumHmvpCand = 0 |  |
|       NumHmvpIbcCand = 0 |  |
|       ResetIbcBuf = 1 |  |
|     } |  |
|     coding_tree_unit( ) |  |
|     if( i = = NumCtusInCurrSlice − 1 ) |  |
|       end_of_slice_one_bit /* equal to 1 */ | ae(v) |
|     else if( CtbAddrX = = CtbToTileColBd[ CtbAddrX + 1 ] − 1 ) { |  |
|       if( CtbAddrY = = CtbToTileRowBd[ CtbAddrY + 1 ] − 1 ) { |  |
|         end_of_tile_one_bit /* equal to 1 */ | ae(v) |
|         byte_alignment( ) |  |
|       } else if( entropy_coding_sync_enabled_flag ) { |  |
|         end_of_subset_one_bit /* equal to 1 */ | ae(v) |
|         byte_alignment( ) |  |
|       } |  |
|     FirstCtbRowInSlice = 0 |  |
|     } |  |
|   } |  |
| } |  |

The value of pps_slice_chunk_enabled_flag being equal to 1 specifies the presence of the syntax element multi_slice_chunks_flag in the slice headers for coded pictures referring to the PPS. The value of pps_slice_chunk_enabled_flag being equal to 0 specifies the absence of the syntax element multi_slice_chunks_flag in the slice headers for coded pictures referring to the PPS.

The value of multi_slice_chunks_flag being equal to 1 specifies that the slice is divided into multiple slice chunks and current slice data is a slice chunk data rather than a complete slice data and the value of each slice header syntax element that is not present is inferred to be equal to the value of the corresponding slice header syntax element in the slice header. The value of multi_slice_chunks_flag being equal to 0 specifies the slice is not divided into multiple slice chunks and the current slice data is a complete slice data. When not present, the value of multi_slice_chunks_flag is inferred to be equal to 0.

The value of first_slice_chunk_in_slice_flag being equal to 1, when present, specifies that the current slice chunk is the first slice chunk of the slice in decoding order. The value of first_slice_chunk_in_slice_flag being equal to 0 specifies that the slice chunk is not the first slice chunk of the slice in decoding order.

In some embodiments, the conditional test in the slice header "if(!multi_slice_chunks_flag||multi_slice_chunks_flag && first_slice_chunk_in_slice_flag)" may be removed so to always send full slice header syntax elements.

The syntax element slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0. If rect_slice_flag is equal to 0, the following applies:

The slice address is the raster scan tile index.
The length of slice_address is Ceil(Log 2 (NumTilesIn-Pic)) bits.

The value of slice_address shall be in the range of 0 to NumTilesInPic−1, inclusive.
Otherwise (rect_slice_flag is equal to 1), the following applies:
 The slice address is the subpicture-level slice index of the slice.
 The length of slice_address is Ceil(Log 2(NumSlicesInSubpic[CurrSubpicIdx]))bits.
 The value of slice_address shall be in the range of 0 to NumSlicesInSubpic[CurrSubpicIdx]−1, inclusive. It is a requirement of bitstream conformance that the following constraints apply:
  If rect_slice_flag is equal to 0 or subpic_info_present_flag is equal to 0, the value of slice_address shall not be equal to the value of slice_address of any other coded slice NAL unit of the same coded picture.
  Otherwise, when multi_slice_chunks_flag is equal to 0, the pair of slice_subpic_id and slice_address values shall not be equal to the pair of slice_subpic_id and slice_address values of any other coded slice NAL unit of the same coded picture.
  Otherwise, the pair of slice_address and slice_chunk_address values shall not be equal to the pair of slice_address and slice_chunk_address values of any other coded slice chunk NAL unit of the same coded picture.
  Otherwise, the triplet (or 3-tuple) of slice_subpic_id, slice_address and slice_chunk_address values shall not be equal to the triplet (or 3-tuple) of slice_subpic_id, slice_address and slice_chunk_address values of any other coded slice chunk NAL unit of the same coded picture.
  The shapes of the slices of a picture shall be such that each CTU, when decoded, shall have its entire left boundary and entire top boundary consisting of a picture boundary or consisting of boundaries of previously decoded CTU(s).
 The value of num_ctu_rows_in_slice_chunk_minus1 plus 1, when present, specifies the number of CTU rows in the current slice chunk. Value of num_ctu_rows_in_slice_chunk_minus1 shall be in the range of 0 to RowHeight[tileY]−2, inclusive, where tileY is the tile row index of the current tile.

For the slice data of a slice chunk, the variables StartCtuNum and EndCtuNum are used to specify the start and end of the slice chunk by identifying the CTUs that correspond to the start and end of the slice chunk. The variables StartCtuNum and EndCtuNum are derived as follows:

```
if( multi_slice_chunks_flag ) {
    tileIdx = SliceTopLeftTileIdx[ picLevelSliceIdx ]
    tileX = tileIdx % NumTileColumns
    NumCtusInSliceChunk = (
        num_ctu_rows_in_slice_chunk_minus1 + 1) *
    colWidth[ tileX ]
    if( first_slice_chunk_in_slice_flag )
        NumCtusInPrevSliceChunks = 0
    StartCtuNum = NumCtusInPrevSliceChunks
    EndCtuNum = StartCtuNum + NumCtusInSliceChunk
    NumCtusInPrevSliceChunks += NumCtusInSliceChunk
} else {
    StartCtuNum = 0
    EndCtuNum = NumCtuInCurrSlice
}
```

The variable num_ctu_rows_in_slice_chunk_minus1+1 or NumCtuRowsInPrevSliceChunks stores the number of CTU rows in the previous slice chunks. In some embodiments, the variables StartCtuNum and EndCtuNum are derived as follows:

```
if( multi_slice_chunks_flag ) {
    tileX = SliceTopLeftTileIdx[ picLevelSliceIdx ] % NumTileColumns
    NumCtusInSliceChunk =
        (num_ctu_rows_in_slice_chunk_minus1+1)*
```

```
if( multi_slice_chunks_flag ) {
    tileX = SliceTopLeftTileIdx[ slice_address ] % NumTileColumns
    NumCtusInSliceChunk = (
        num_ctu_rows_in_slice_chunk_minus1 + 1) *
    colWidth[ tileX ]
    if( first_slice_chunk_in_slice_flag)
        EndCtuNum = 0
    StartCtuNum = EndCtuNum
    EndCtuNum = StartCtuNum + NumCtusInSliceChunk
} else {
    StartCtuNum = 0
    EndCtuNum = NumCtusInCurrSlice
}
```

In the example of FIG. 1, the slices 111 and 112 are not divided into slice chunks, while the slice 113 is divided into multiple slice chunks as indicated by multi_slice_chunks_flag. The slice chunk 121 is the first slice chunk in the slice 113 as indicated by first_slice_chunk_flag. Each slice chunk can be specified by identifying a start CTU and an end CTU and/or the number of CTU rows it encompasses. For example, for the slice chunk 122, StartCtuNum specifies "18", which is an index or number within the slice 113 identifying the CTU at the start of the slice chunk 122, while EndCtuNum specifies "44", which is an index or number within the slice 113 identifying the CTU at the end of the slice chunk 122. NumCtuRowsInPrevSliceChunks specifies "3" as there are 3 CTU rows in the slice chunk 122.

In some embodiments, the syntax element first_slice_chunk_in_slice_flag can be replaced by a syntax element slice_chunk_address, which is used to indicate the CTU row index of the first CTU row in current slice chunk of the slice. When the value of slice_chunk_address is equal to 0, the current slice chunk is the first slice chunk of the slice in decoding order. Table 2D shows a slice header syntax structure in which slice_chunk_address is used to indicate the first CTU row in current slice chunk of the slice.

TABLE 2D

Portion of Slice Header with Slice Chunk Address

| | |
|---|---|
| if( rect_slice_flag && pps_slice_chunk_enabled_flag ) { | |
|   multi_slice_chunks_flag | u(1) |
|   if( multi_slice_chunks_flag ) { | |
|     slice_chunk_address | ue(v) |
|     num_ctu_rows_in_slice_chunk_minus1 | ue(v) |
|   } | |
| } | |
| for( i = 0; i < NumExtraPhBits; i++ ) | |
|   sh_extra_bit[ i ] | u(1) |
| if( !rect_slice_flag && NumTilesInPic > 1 ) | |
|   num_tiles_in_slice_minus1 | ue(v) |
| if( !multi_slice_chunks_flag \|\| multi_slice_chunks_flag && slice_chunk_address = 0 ) { | |
|   ... | |
| } | |

The syntax element slice_chunk_address specifies the slice chunk address of the slice chunk in the slice within the tile. The slice_chunk_address is the CTU row index of the first CTU row in the slice chunk. In some embodiments, the variables StartCtuNum and EndCtuNum (respectively specifying the starting CTU and the ending CTU in the current slice chunk) and are derived as follows:

```
colWidth[ tileX ]
    StartCtuNum = slice_chunk_address * colWidth[ tileX ]
    EndCtuNum = StartCtuNum + NumCtusInSliceChunk
} else {
    StartCtuNum = 0
    EndCtuNum = NumCtusInCurrSlice
}
```

In some embodiments, the condition test in the slice header "if(!multi_slice_chunks_flag||multi_slice_chunks_flag && slice_chunk_address=0)" may be removed so to always send full slice header syntax elements.

III. Slice Address

The tile and rectangular slice syntax structures are specified in the PPS of Table 1 covering both cases of uniform and non-uniform tile columns and rows for a slice layout. Section II describes video pictures having a tile that includes multiple slices. However, a video picture may also have a slice that includes multiple tiles. In some embodiments, for a slice that includes multiple tiles, a corresponding slice header signals a slice address and a number of tiles. Table 3 illustrates a slice header syntax structure in which slice address is signaled and corresponding number of tiles in the slice for raster scan slices is also signaled.

TABLE 3

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice_type = = B ) | |

TABLE 3-continued

| | Descriptor |
|---|---|
| slice_collocated_from_l0_flag | u(1) |
| if( ( slice_collocated_from_l0_flag && NumRefIdxActive[ 0 ] > 1 ) \|\| | |
|     ( ! slice_collocated_from_l0_flag && NumRefIdx Active[ 1 ] > 1 ) | |
| ) | |
|     slice_collocated_ref_idx | ue(v) |
| } | |
| if( !wp_info_in_ph_flag && ( ( pps_weighted_pred_flag && slice_type == P ) \|\| | |
|     ( pps_weighted_bipred_flag && slice_type == B ) ) ) | |
|     pred_weight_table( ) | |
| } | |
| if( !qp_delta_info_in_ph_flag ) | |
|     slice_qp_delta | se(v) |
| if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|         slice_joint_cbcr_qp_offset | se(v) |
| } | |
| if( pps_cu_chroma_qp_offset_list_enabled_flag ) | |
|     cu_chroma_qp_offset_enabled_flag | u(1) |
| if( sps_sao_enabled_flag && !sao_info_in_ph_flag ) { | |
|     slice_sao_luma_flag | u(1) |
|     if( ChromaArrayType != 0 ) | |
|         slice_sao_chroma_flag | u(1) |
| } | |
| if( deblocking_filter_override_enabled_flag && !dbf_info_in_ph_flag ) | |
|     slice_deblocking_filter_override_flag | u(1) |
| if( slice_deblocking_filter_override_flag ) { | |
|     slice_deblocking_filter_disabled_flag | u(1) |
|     if( !slice_deblocking_filter_disabled_flag ) { | |
|         slice_beta_offset_div2 | se(v) |
|         slice_tc_offset_div2 | se(v) |
|         slice_cb_beta_offset_div2 | se(v) |
|         slice_cb_tc_offset_div2 | se(v) |
|         slice_cr_beta_offset_div2 | se(v) |
|         slice_cr_tc_offset_div2 | se(v) |
|     } | |
| } | |
| slice_ts_residual_coding_disabled_flag | u(1) |
| if( ph_lmcs_enabled_flag ) | |
|     slice_lmcs_enabled_flag | u(1) |
| if( ph_explicit_scaling_list_enabled_flag ) | |
|     slice_explicit_scaling_list_used_flag | u(1) |
| if( NumEntryPoints > 0 ) { | |
|     offset_len_minus1 | ue(v) |
|     for( i = 0; i < NumEntryPoints; i++ ) | |
|         entry_point_offset_minus1[ i ] | u(v) |
| } | |
| if( slice_header_extension_present_flag ) { | |
|     slice_header_extension_length | ue(v) |
|     for( i = 0; i < slice_header_extension_length; i++) | |
|         slice_header_extension_data_byte[ i ] | u(8) |
| } | |
| byte_alignment( ) | |
| } | |

The syntax element slice_address specifies the slice address of the slice. When not present, the value of slice_address is inferred to be equal to 0. If rect_slice_flag is equal to 0, the following applies:
  The slice address is the raster scan tile index of the first tile in the slice.
  The length of slice_address is Ceil(Log 2 (NumTilesIn-Pic)) bits.
  The value of slice_address shall be in the range of 0 to NumTilesInPic−1, inclusive.
Otherwise (rect_slice_flag is equal to 1), the following applies:
  The slice address is the subpicture-level slice index of the slice.
  The length of slice_address is
    Ceil(Log 2(NumSlicesInSubpic[CurrSubpicIdx])) bits.
  The value of slice_address shall be in the range of 0 to NumSlicesInSubpic [CurrSubpicIdx]−1, inclusive.
In some embodiments, the following constraints apply to slice address:
  If rect_slice_flag is equal to 0 or subpic_info_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  The shapes of the slices of a picture shall be such that each CTU, when decoded, shall have its entire left boundary and entire top boundary consisting of a picture boundary or consisting of boundaries of previously decoded CTU(s).

The syntax element num_tiles_in_slice_minus1 plus 1, when present, specifies the number of tiles in the slice. The value of num_tiles_in_slice_minus1 shall be in the range of 0 to NumTilesInPic−1, inclusive.

In some embodiments, the slice addresses for raster scan slices in a picture is derived or inferred instead of being explicit signaled, because the current slice address is equal to the previous slice address plus the number of tiles in the previous slice and the first slice address is equal to 0. Specifically, the syntax element slice_address is inferred to be equal to 0 when not present. For some embodiments, Table 4 illustrates a segment of the slice header for specifying slice address.

TABLE 4

```
if( ( rect_slice_flag && NumSlicesInSubpic[ CurrSubpicIdx ] > 1 )
    slice_address                                              u(v)
for( i = 0; i < NumExtraShBits; i++ )
    sh_extra_bit[ i ]                                          u(1)
if( !rect_slice_flag && NumTilesInPic > 1 )
    num_tiles_in_slice_minus1                                  ue(v)
```

Specifically, if rect_slice_flag is equal to 0, the following applies:
  The slice address is the raster scan tile index of the first tile in the slice.
  Varible NextSliceAddress, which specifies the slice address of the next slice, is initialized to be 0 for the first slice in the picture
  The value of slice_address is derived as follows:

slice_address=NextSliceAddres

NextSliceAddress+=num_tiles_in_slice_minus1+1

Otherwise (rect_slice_flag is equal to 1), the following applies:
  The slice address is the subpicture-level slice index of the slice.
  The length of slice_address is Ceil(Log 2(NumSlicesInSubpic[CurrSubpicIdx])) bits.
  The value of slice_address is constrained to be in the range of 0 to NumSlicesInSubpic [CurrSubpicIdx]−1, inclusive.
In some embodiments, the follow constraints are applied:
  If rect_slice_flag is equal to 0 or subpic_info_present_flag is equal to 0, the value of slice_address is not equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  The shapes of the slices of a picture shall be such that each CTU, when decoded, have its entire left boundary and entire top boundary consisting of a picture boundary or consisting of boundaries of previously decoded CTU(s).

IV. Order of VCL NAL Units and their Association with Coded Pictures

In some embodiments, the order of the Video Coding Layer (VCL) NAL units within a coded picture is constrained as follows:
  For any two coded slice or slice chunk NAL units A and B of a coded picture, let subpicIdxA and subpicIdxB be their respective subpicture level index values, sliceAddrA and sliceddrB be their their slice_address values, and sliceChunkAddrA and sliceChunkAddrB be their respective slice_chunk_address values of the slice chunks,
    When any of the following conditions is true, coded slice or slice chunk NAL unit A shall precede coded slice or slice chunk NAL unit B:
    subpicIdxA is less than subpicIdxB.
    subpicIdxA is equal to subpicIdxB and sliceAddrA is less than sliceAddrB.
    subpicIdxA is equal to subpicIdxB, sliceAddrA is equal to sliceAddrB and sliceChunkAddrA is less than sliceChunkAddrB.

The syntax element slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

V. Example Video Encoder

Figure 2:
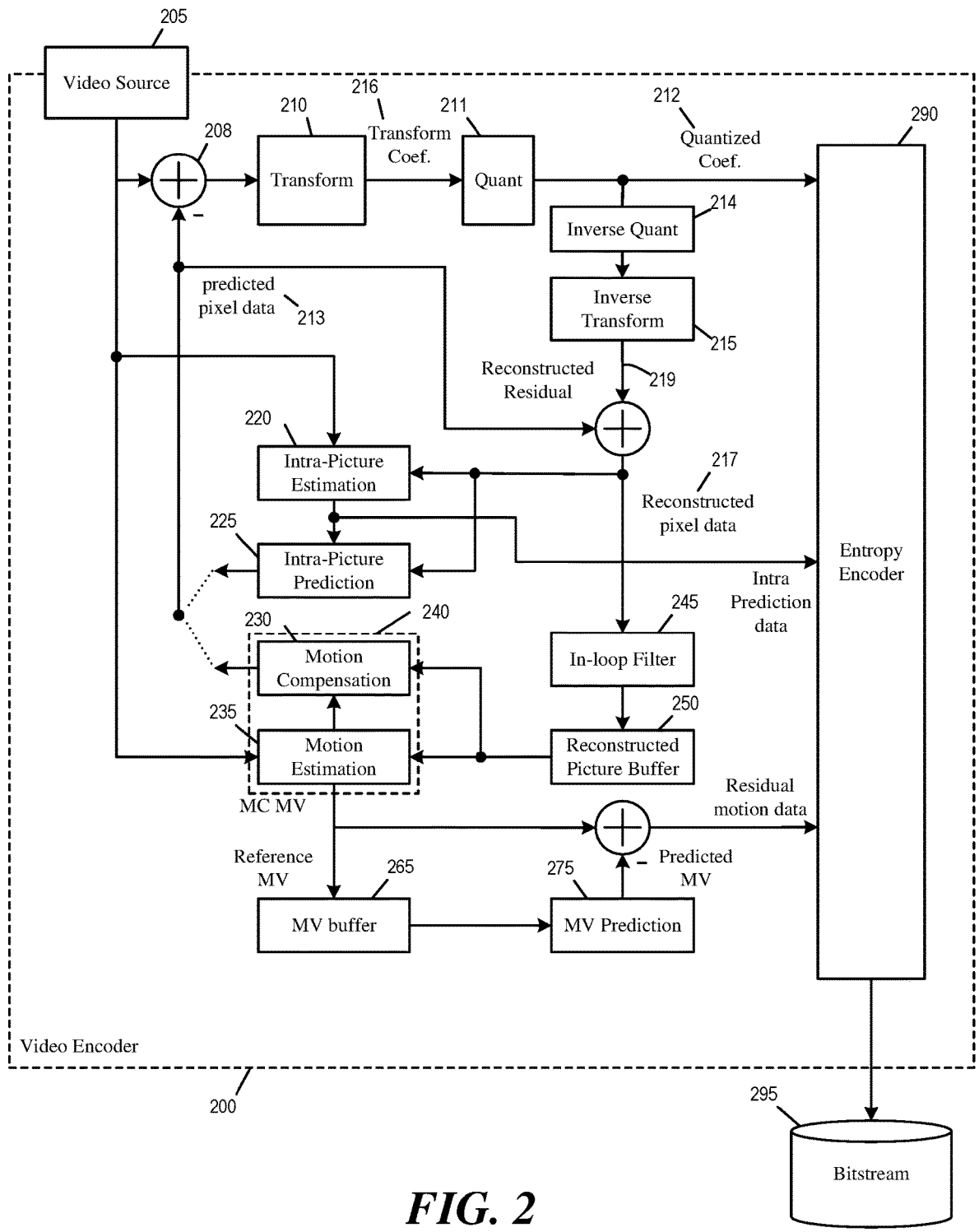
FIG. 2 illustrates an example video encoder that may partition slices into slice chunks when encoding a video picture.

FIG. 2 illustrates an example video encoder 200 that may partition slices into slice chunks when encoding a video picture. As illustrated, the video encoder 200 receives input video signal from a video source 205 and encodes the signal into bitstream 295. The video encoder 200 has several components or modules for encoding the signal from the video source 205, at least including some components selected from a transform module 210, a quantization module 211, an inverse quantization module 214, an inverse transform module 215, an intra-picture estimation module 220, an intra-prediction module 225, a motion compensation module 230, a motion estimation module 235, an in-loop filter 245, a reconstructed picture buffer 250, a MV buffer 265, and a MV prediction module 275, and an entropy encoder 290. The motion compensation module 230 and the motion estimation module 235 are part of an inter-prediction module 240.

In some embodiments, the modules 210-290 are modules of software instructions being executed by one or more processing units (e.g., a processor) of a computing device or electronic apparatus. In some embodiments, the modules 210-290 are modules of hardware circuits implemented by one or more integrated circuits (ICs) of an electronic apparatus. Though the modules 210-290 are illustrated as being separate modules, some of the modules can be combined into a single module.

The video source 205 provides a raw video signal that presents pixel data of each video frame without compression. A subtractor 208 computes the difference between the raw video pixel data of the video source 205 and the predicted pixel data 213 from the motion compensation module 230 or intra-prediction module 225. The transform module 210 converts the difference (or the residual pixel data or residual signal 209) into transform coefficients (e.g., by performing Discrete Cosine Transform, or DCT). The quantization module 211 quantizes the transform coefficients into quantized data (or quantized coefficients) 212, which is encoded into the bitstream 295 by the entropy encoder 290.

The inverse quantization module 214 de-quantizes the quantized data (or quantized coefficients) 212 to obtain transform coefficients, and the inverse transform module 215 performs inverse transform on the transform coefficients to produce reconstructed residual 219. The reconstructed residual 219 is added with the predicted pixel data 213 to produce reconstructed pixel data 217. In some embodiments, the reconstructed pixel data 217 is temporarily stored in a line buffer (not illustrated) for intra-picture prediction and spatial MV prediction. The reconstructed pixels are filtered by the in-loop filter 245 and stored in the reconstructed picture buffer 250. In some embodiments, the reconstructed picture buffer 250 is a storage external to the video encoder 200. In some embodiments, the reconstructed picture buffer 250 is a storage internal to the video encoder 200.

The intra-picture estimation module 220 performs intra-prediction based on the reconstructed pixel data 217 to produce intra prediction data. The intra-prediction data is provided to the entropy encoder 290 to be encoded into bitstream 295. The intra-prediction data is also used by the intra-prediction module 225 to produce the predicted pixel data 213.

The motion estimation module 235 performs inter-prediction by producing MVs to reference pixel data of previously decoded frames stored in the reconstructed picture buffer 250. These MVs are provided to the motion compensation module 230 to produce predicted pixel data.

Instead of encoding the complete actual MVs in the bitstream, the video encoder 200 uses MV prediction to generate predicted MVs, and the difference between the MVs used for motion compensation and the predicted MVs is encoded as residual motion data and stored in the bitstream 295.

The MV prediction module 275 generates the predicted MVs based on reference MVs that were generated for encoding previously video frames, i.e., the motion compensation MVs that were used to perform motion compensation. The MV prediction module 275 retrieves reference MVs from previous video frames from the MV buffer 265. The video encoder 200 stores the MVs generated for the current video frame in the MV buffer 265 as reference MVs for generating predicted MVs.

The MV prediction module 275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 295 by the entropy encoder 290.

The entropy encoder 290 encodes various parameters and data into the bitstream 295 by using entropy-coding techniques such as context-adaptive binary arithmetic coding (CABAC) or Huffman encoding. The entropy encoder 290 encodes various header elements, flags, along with the quantized transform coefficients 212, and the residual motion data as syntax elements into the bitstream 295. The bitstream 295 is in turn stored in a storage device or transmitted to a decoder over a communications medium such as a network.

The in-loop filter 245 performs filtering or smoothing operations on the reconstructed pixel data 217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 3:
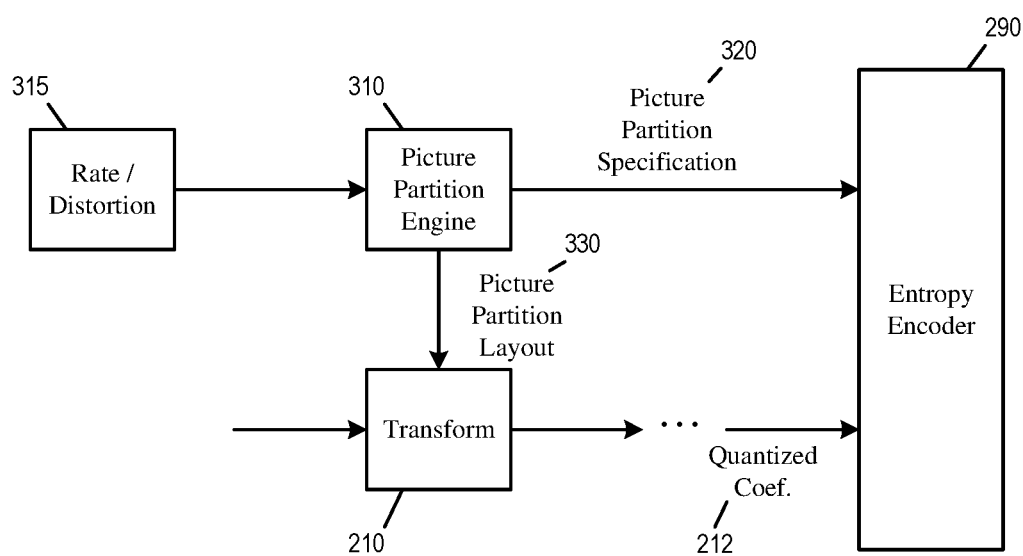
FIG. 3 illustrates portions of the video encoder that encodes tiles, slices, and slice chunks.

FIG. 3 illustrates portions of the video encoder 200 that encodes tiles, slices, and slice chunks. Specifically, a picture partition engine 310 generates a set of picture partitioning specifications 320 for the entropy encoder 290 based on a set of hardware and rate/distortion information 315. These picture partitioning specifications 320 may include position and size information regarding tiles, slices, and slice chunks.

The entropy encoder 290 correspondingly signals flags or parameters such as positions and sizes of slices and/or slice chunks (with positions and sizes of some slices and slice chunks inferred and not signaled), slice chunk enable indications, multiple slice chunk indications, first slice chunk in slice indication, indices of starting and ending CTUs of slice chunks, etc. in SPSs, PPSs, or slice headers of the bitstream 295. The picture partition engine 310 also provides corresponding picture partitioning layout 330 to the transform module 210, intra-picture estimation module 220, Intra-picture prediction module 225, inter-prediction module 240, etc., so these modules may encode the current picture according to the layouts of the tiles, slices, and slice chunks.

For a slice that is partitioned into slice chunks, the encoder 200 perform prediction, transform, and other pixel operations to generate the transform coefficients of the slice, while the entropy encoder 290 packages the slice data into different NAL units that correspond to the different slice chunks for delivery.

Figure 4:
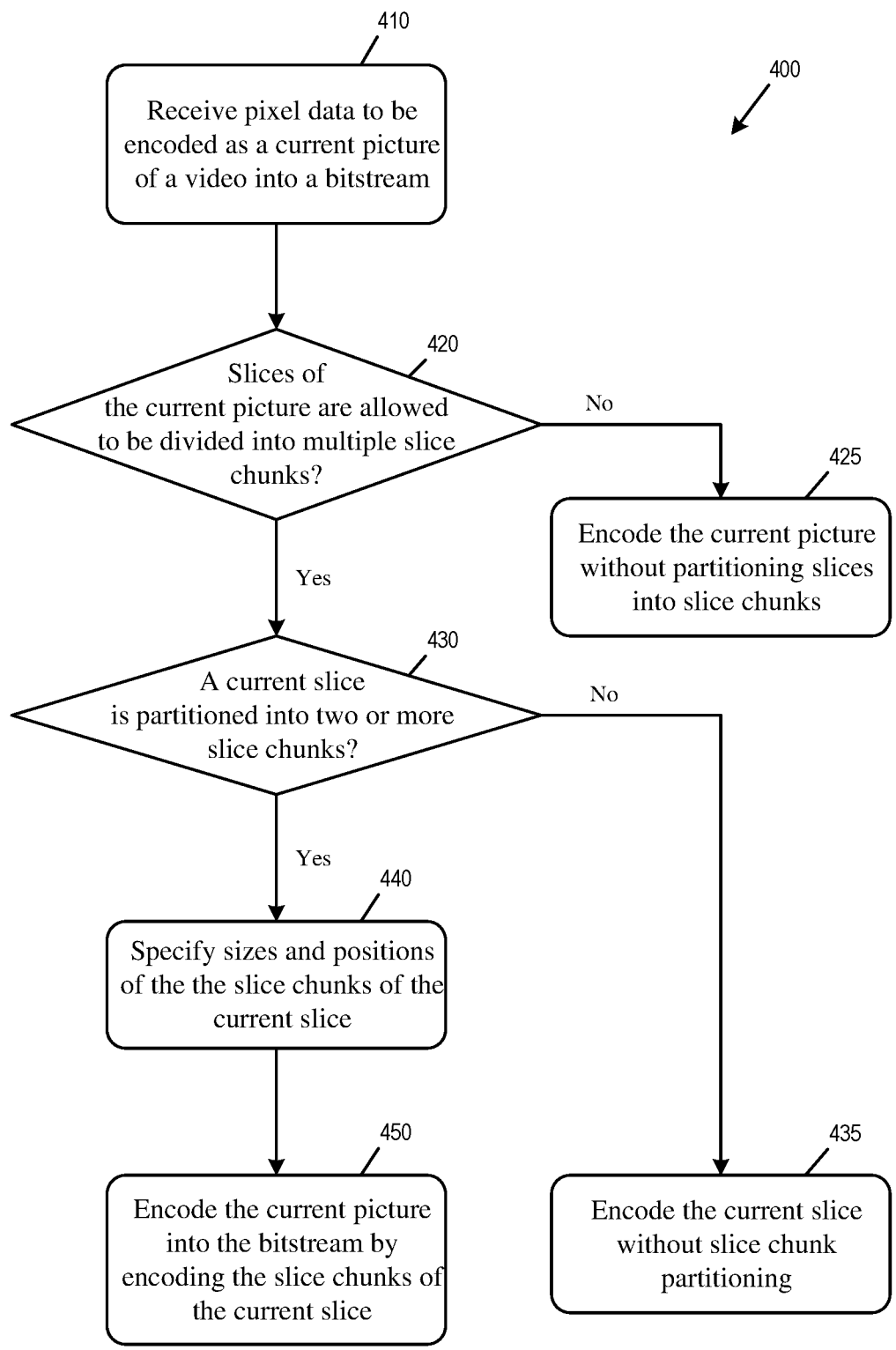
FIG. 4 conceptually illustrates a process for encoding video pictures in which slices may be partitioned into slice chunks.

FIG. 4 conceptually illustrates a process 400 for encoding video pictures in which slices may be partitioned into slice chunks. In some embodiments, one or more processing units (e.g., a processor) of a computing device implements the encoder 200 performs the process 400 by executing instructions stored in a computer readable medium. In some embodiments, an electronic apparatus implementing the encoder 200 performs the process 400.

The encoder receives (at block 410) pixel data to be encoded as a current picture of a video into a bitstream.

The encoder determines (at block 420) whether slices of the current picture are allowed to be divided into multiple slice chunks. In some embodiments, a first syntax element (e.g., slice_chunk_enable_flag) in a PPS of the current picture is used to indicate whether one or more slices of the current picture are allowed to be divided into multiple slice chunks. If the slices of the current picture are allowed to be divided into multiple slice chunks, the process proceeds to block 430. Otherwise, the encoder encodes (at block 425) the current picture without partitioning the slices of the current picture into slice chunks for delivery.

At block 430, the encoder determines whether a current slice being encoded is partitioned into two or more slice chunks. In some embodiments, the current picture is partitioned into multiple tiles and the current slice is a division of one of the tiles. In some embodiments, a second syntax element (e.g., multi_slice chunk_flag) in a slice header of the current slice of the current picture is used to indicate whether the current slice is partitioned into two or more slice chunks. If the current slice is partitioned into multiple slice chunks, the process proceeds to block 440. Otherwise, the encoder encodes (at block 435) the current slice without partitioning the current slice into slice chunks for delivery.

At block 440, the encoder specifies (at block 440) sizes and positions of the slice chunks of the current slice. In some embodiments, the size of a slice chunk is specified in the bitstream (syntax element num_ctu_rows_in_slice_chunk) as a number of rows of coded tree units (CTUs) that are in the slice chunk. In some embodiments, a syntax element (first_slice_chunk_flag in slice header) indicates whether a particular slice chunk is a first slice chunk that is coded in the current slice. In some embodiments, a syntax element (slice chunk address in slice header) specifies an address of a particular slice chunk by identifying a CTU row in the tile that includes the current slice. In some embodiments, syntax elements in the bitstream identify a CTU that corresponds to the start of a particular slice chunk and a CTU that corresponds to the end of the particular slice chunk (StartCtuNum and EndCtuNum in slice data). The encoder encodes (at block 450) the slice chunks of the current slice into the bitstream according to the specified sizes and positions of the slice chunks. Each slice chunk is to be delivered in a different NAL unit.

In some embodiments, the current slice is partitioned into multiple tiles. If the current slice is not a rectangular slice (i.e., the slice is a raster scan slice), a slice address of the current slice is specified by a syntax element that identifies a particular tile (e.g., the first tile) in the slice. If the current slice is a rectangular slice (i.e., the slice is not a raster scan slice), a slice address of the current slice is specified by adding a number of tiles in a slice to an address of a previously coded slice.

VI. Example Video Decoder

In some embodiments, an encoder may signal (or generate) one or more syntax element in a bitstream, such that a decoder may parse said one or more syntax element from the bitstream.

Figure 5:
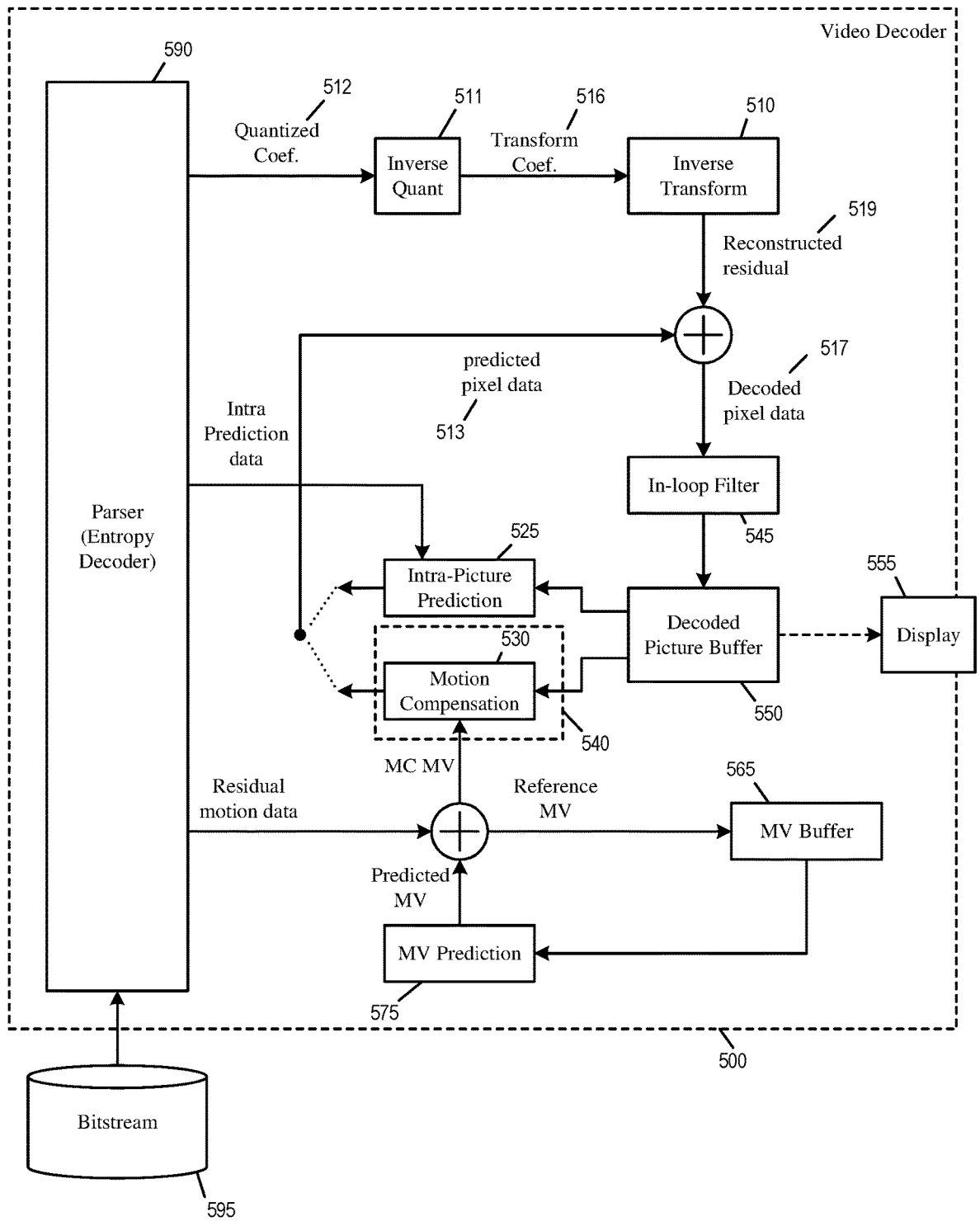
FIG. 5 illustrates an example video decoder that may reconstruct video pictures in which slices are partitioned into slice chunks.

FIG. 5 illustrates an example video decoder 500 that may reconstruct video pictures in which slices are partitioned into slice chunks. As illustrated, the video decoder 500 is an image-decoding or video-decoding circuit that receives a bitstream 595 and decodes the content of the bitstream into pixel data of video frames for display. The video decoder 500 has several components or modules for decoding the bitstream 595, including some components selected from an inverse quantization module 511, an inverse transform module 510, an intra-prediction module 525, a motion compensation module 530, an in-loop filter 545, a decoded picture buffer 550, a MV buffer 565, a MV prediction module 575, and a parser 590. The motion compensation module 530 is part of an inter-prediction module 540.

In some embodiments, the modules 510-590 are modules of software instructions being executed by one or more processing units (e.g., a processor) of a computing device. In some embodiments, the modules 510-590 are modules of hardware circuits implemented by one or more ICs of an electronic apparatus. Though the modules 510-590 are illustrated as being separate modules, some of the modules can be combined into a single module.

The parser 590 (or entropy decoder) receives the bitstream 595 and performs initial parsing according to the syntax defined by a video-coding or image-coding standard. The parsed syntax element includes various header elements, flags, as well as quantized data (or quantized coefficients) 512. The parser 590 parses out the various syntax elements by using entropy-coding techniques such as context-adaptive binary arithmetic coding (CABAC) or Huffman decoding.

The inverse quantization module 511 de-quantizes the quantized data (or quantized coefficients) 512 to obtain transform coefficients, and the inverse transform module 510 performs inverse transform on the transform coefficients 516 to produce reconstructed residual signal 519. The reconstructed residual signal 519 is added with predicted pixel data 513 from the intra-prediction module 525 or the motion compensation module 530 to produce decoded pixel data 517. The decoded pixels data are filtered by the in-loop filter 545 and stored in the decoded picture buffer 550. In some embodiments, the decoded picture buffer 550 is a storage external to the video decoder 500. In some embodiments, the decoded picture buffer 550 is a storage internal to the video decoder 500.

The intra-prediction module 525 receives intra-prediction data from bitstream 595 and according to which, produces the predicted pixel data 513 from the decoded pixel data 517 stored in the decoded picture buffer 550. In some embodiments, the decoded pixel data 517 is also stored in a line buffer (not illustrated) for intra-picture prediction and spatial MV prediction.

In some embodiments, the content of the decoded picture buffer 550 is used for display. A display device 555 either retrieves the content of the decoded picture buffer 550 for display directly, or retrieves the content of the decoded picture buffer to a display buffer. In some embodiments, the display device receives pixel values from the decoded picture buffer 550 through a pixel transport.

The motion compensation module 530 produces predicted pixel data 513 from the decoded pixel data 517 stored in the decoded picture buffer 550 according to motion compensation MVs (MC MVs). These motion compensation MVs are decoded by adding the residual motion data received from the bitstream 595 with predicted MVs received from the MV prediction module 575.

The MV prediction module 575 generates the predicted MVs based on reference MVs that were generated for decoding previous video frames, e.g., the motion compensation MVs that were used to perform motion compensation. The MV prediction module 575 retrieves the reference MVs of previous video frames from the MV buffer 565. The video decoder 500 stores the motion compensation MVs generated for decoding the current video frame in the MV buffer 565 as reference MVs for producing predicted MVs.

The in-loop filter 545 performs filtering or smoothing operations on the decoded pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 6:
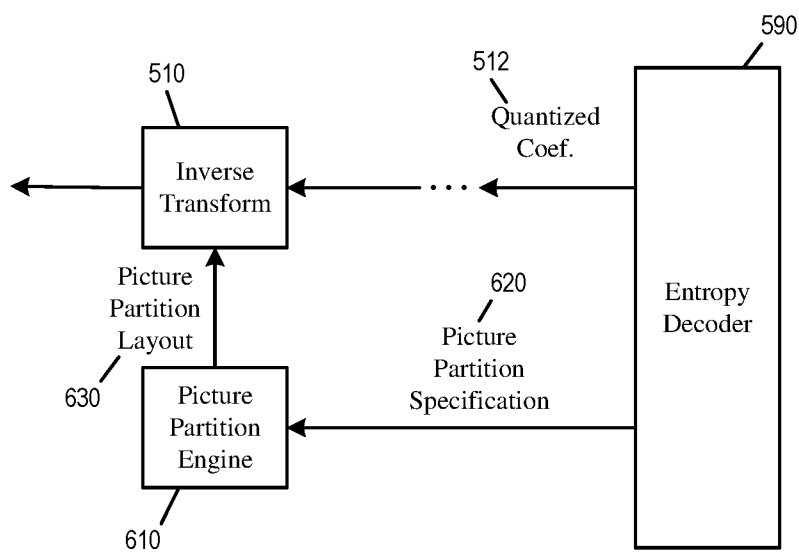
FIG. 6 illustrates portions of the video decoder that receives and applies specifications of tiles, slices, and slice chunks.

FIG. 6 illustrates portions of the video decoder 500 that receives and applies specifications of tiles, slices, and slice chunks. Specifically, the entropy decoder 590 parses the bitstream 595 for syntax elements related to picture partitioning, including flags or parameters such as positions and sizes of slices and/or slice chunks (with positions and sizes of some slices and slice chunks inferred and not signaled), slice chunk enable indications, multiple slice chunk indications, first slice chunk in slice indication, indices of starting and ending CTUs of slice chunks, etc. in SPSs, PPSs, or slice headers of the bitstream 595.

For a slice that is partitioned into slice chunks, the entropy decoder 590 receives delivery of the slice data in different NAL units that correspond to the different slice chunks, while the rest of the video decoder 500 perform prediction, transform, and other pixel operations on the slice data of the slice. For example, when processing the slice 113 of FIG. 1, the data of the slice 113 is delivered in three NAL units that corresponds to the three slice chunks 121-123, but the data from all three chunks is decoded together as one slice.

Based on the parsed syntax elements, the entropy decoder 590 generates a set of picture partitioning information 620 for a picture partition engine 610. The picture partition engine 610 provides corresponding picture partitioning layout 630 to the inverse transform module 510, Intra-picture prediction module 525, inter-prediction module 540, etc., so these modules may reconstruct the current picture according to the layouts of the tiles, slices, and slice chunks.

Figure 7:
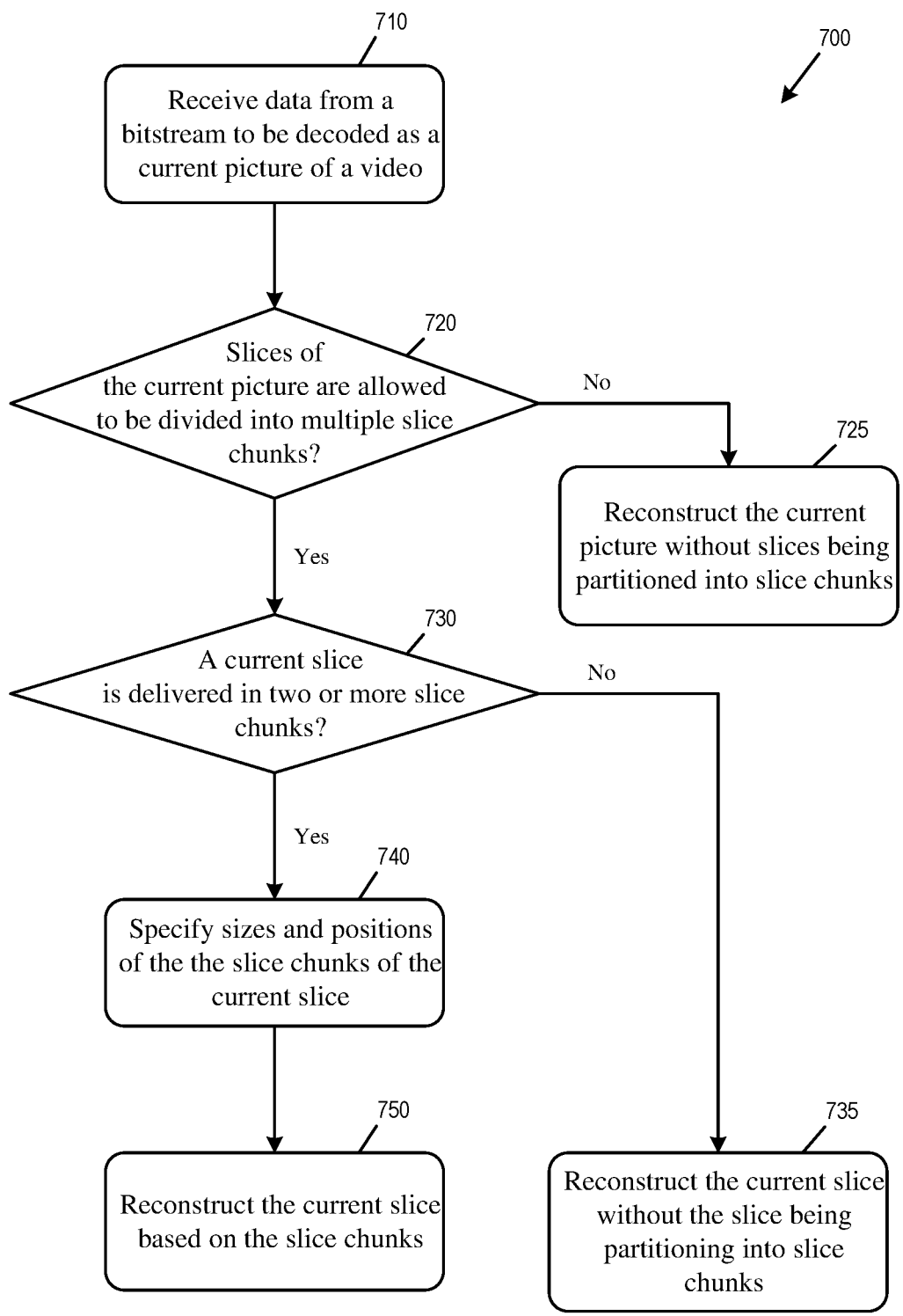
FIG. 7 conceptually illustrates a process for decoding video pictures in which slices may be partitioned into slice chunks.

FIG. 7 conceptually illustrates a process 700 for decoding video pictures in which slices may be partitioned into slice chunks. In some embodiments, one or more processing units (e.g., a processor) of a computing device implements the decoder 500 performs the process 700 by executing instructions stored in a computer readable medium. In some embodiments, an electronic apparatus implementing the decoder 500 performs the process 700.

The decoder receives (at block 710) data from a bitstream to be decoded as a current picture of a video.

The decoder determines (at block 720) whether slices of the current picture are allowed to be divided into multiple slice chunks. In some embodiments, a first syntax element (e.g., slice_chunk_enable_flag) in a PPS of the current picture is used to indicate whether one or more slices of the current picture are allowed to be divided into multiple slice chunks. If the slices of the current picture are allowed to be divided into multiple slice chunks, the process proceeds to block 730. Otherwise, the decoder reconstructs (at block 725) the current picture without the slices of the picture being partitioned into slice chunks.

At block 730, the decoder determines whether a current slice being decoded is delivered in two or more slice chunks. In other words, whether the current slice is partitioned into two or more slice chunks such that each slice chunk is delivered in a different NAL unit. In some embodiments, the current picture is partitioned into multiple tiles and the current slice is a division of one of the tiles. In some embodiments, a second syntax element (e.g., multi_slice chunk_flag) in a slice header of the current slice of the current picture is used to indicate whether the current slice is partitioned into two or more slice chunks. If the current slice is partitioned into multiple slice chunks, the process proceeds to block 740. Otherwise, the decoder reconstructs (at block 735) the current slice without the slice being partitioned into slice chunks.

At block 740, the decoder specifies (at block 740) sizes and positions of the slice chunks of the current slice. In some embodiments, the size of a slice chunk is specified in the bitstream (syntax element num_ctu_rows_in_slice_chunk) as a number of rows of coded tree units (CTUs) that are in the slice chunk. In some embodiments, a syntax element (first_slice_chunk_flag in slice header) indicates whether a particular slice chunk is a first slice chunk that is coded in the current slice. In some embodiments, a syntax element (slice chunk address in slice header) specifies an address of a particular slice chunk by identifying a CTU row in the tile that includes the current slice. In some embodiments, syntax elements in the bitstream identify a CTU that corresponds to the start of a particular slice chunk and a CTU that corresponds to the end of the particular slice chunk (StartCtuNum and EndCtuNum in slice data). The decoder reconstructs (at block 750) the current slice according to the specified sizes and positions of the slice chunks.

In some embodiments, the current slice is partitioned into multiple tiles. If the current slice is not a rectangular slice (or raster scan slice), a slice address of the current slice is specified by a syntax element that identifies a particular tile (e.g., the first tile) in the slice. If the current slice is a rectangular slice (not a raster scan slice), a slice address of the current slice is specified by adding a number of tiles in a slice to an address of a previously coded slice.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 8:
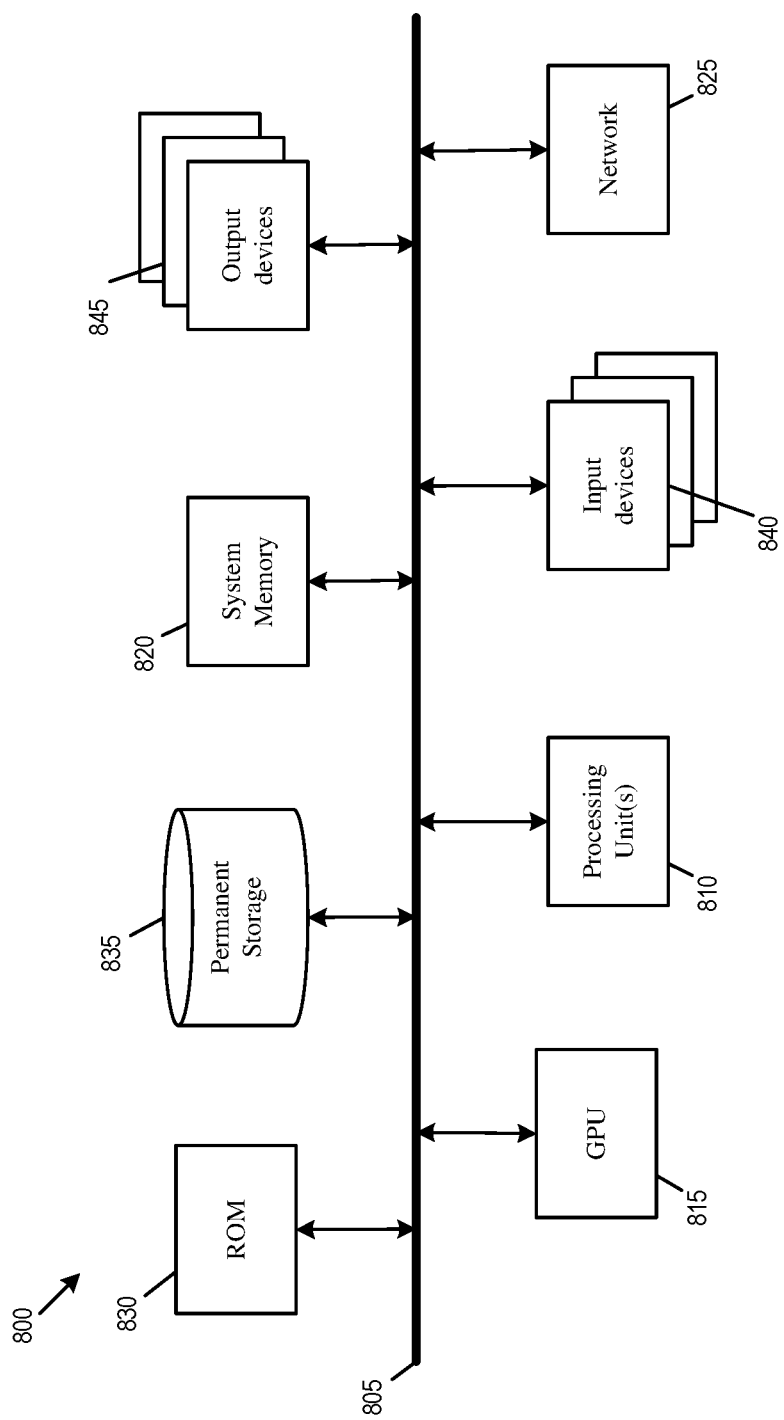
FIG. 8 conceptually illustrates an electronic system with which some embodiments of the present disclosure are implemented.

FIG. 8 conceptually illustrates an electronic system 800 with which some embodiments of the present disclosure are implemented. The electronic system 800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 800 includes a bus 805, processing unit(s) 810, a graphics-processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the GPU 815, the read-only memory 830, the system memory 820, and the permanent storage device 835.

From these various memory units, the processing unit(s) 810 retrieves instructions to execute and data to process in order to execute the processes of the present disclosure. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are used by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the present disclosure use a mass-storage device (such as a magnetic or optical disk and its corresponding disk drive) as the permanent storage device 835.

Other embodiments use a removable storage device (such as a floppy disk, flash memory device, etc., and its corresponding disk drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor uses at runtime. In some embodiments, processes in accordance with the present disclosure are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 4 and FIG. 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
    receiving data from a bitstream to be decoded as a current picture of a video;
    determining whether one or more slices of the current picture are allowed to be divided into slice chunks according to at least a first syntax element in a picture parameter set (PPS) of the current picture provided in the bitstream; and
    in a case that the one or more slices of the current picture are determined as allowed to be divided into the slice chunks:
        determining whether a current slice of the current picture is to be delivered as multiple current slice chunks according to at least a second syntax element in a slice header of the current slice of the current picture provided in the bitstream;
        in response to the current slice being determined to be delivered as the multiple current slice chunks,
            obtaining sizes and positions of the multiple current slice chunks of the current slice according to information provided in the slice header of the current slice,
            obtaining pieces of chunk data of the multiple current slice chunks respectively delivered in separate transmission data units, and
            reconstructing the current slice based on the pieces of chunk data of the multiple current slice chunks and the sizes and the positions of the multiple current slice chunks; and
        in response to the current slice being determined not to be delivered as the multiple current slice chunks,
            obtaining slice data of the current slice delivered in a single transmission data unit, and
            reconstructing the current slice based on the slice data of the current slice.

2. The video decoding method of claim 1, wherein the current picture is partitioned into multiple tiles and the current slice is a division of one of the multiple tiles.

3. The video decoding method of claim 1, wherein a size of one of the multiple current slice chunks is specified in the bitstream as a number of rows of coded tree units (CTUs) that are in the one of the multiple current slice chunks.

4. The video decoding method of claim 1, wherein a third syntax element indicates that a particular slice chunk is a first slice chunk of the multiple current slice chunks that is coded in the current slice.

5. The video decoding method of claim 1, wherein a third syntax element specifies an address of a particular slice chunk of the multiple current slice chunks by identifying a coded tree units (CTUs) row in a tile that includes the current slice.

6. The video decoding method of claim 1, wherein syntax elements in the bitstream identify a first coded tree unit (CTU) that corresponds to a start of a particular slice chunk and a second CM that correspond to an end of the particular slice chunk.

7. The video decoding method of claim 1, wherein the current slice is partitioned into multiple tiles.

8. The video decoding method of claim 7, wherein, when the current slice is not a rectangular slice, a slice address of the current slice is specified by identifying a particular tile in the current slice.

9. The video decoding method of claim 8, wherein, when the current slice is not a rectangular slice, a slice address of the current slice is specified by adding a number of tiles in a previously coded slice to an address of the previously coded slice.

10. The video decoding method of claim 1, wherein each one of the separate transmission data units or the single transmission data unit is a Network Abstraction Layer (NAL) unit.

11. A video encoding method, comprising:
    receiving pixel data to be encoded as a current picture of a video into a bitstream;
    determining whether one or more slices of the current picture are allowed to be divided into slice chunks and setting a first syntax element in a picture parameter set (PPS) of the current picture to be included in the bitstream to indicate whether the one or more slices of the current picture are allowed to be divided into the slice chunks; and
    in a case that the one or more slices of the current picture are determined as allowed to be divided into the slice chunks:

determining whether a current slice of the current picture is to be delivered as multiple current slice chunks and setting a second syntax element in a slice header of the current slice of the current picture to be included in the bitstream to indicate whether the current slice is to be delivered as multiple current slice chunks:

in response to the current slice being determined to be delivered as the multiple current slice chunks,
including information specifying sizes and positions of the multiple current slice chunks of the current slice in the slice header of the current slice, and
encoding the current slice according to the sizes and positions of the multiple current slice chunks to obtain pieces of chunk data of the multiple current slice chunks that are to be respectively delivered in separate transmission data units: and in response to the current slice being determined not to be delivered as the multiple current slice chunks,
encoding the current slice to obtain slice data of the current slice that is to be delivered in a single transmission data unit.

12. An electronic apparatus, comprising:
a video decoder circuit configured to:
receive data from a bitstream to be decoded as a current picture of a video;
determine whether one or more slices of the current picture are allowed to be divided into slice chunks according to at least a first syntax element in a picture parameter set (PPS) of the current picture provided in the bitstream; and
in a case that the one or more slices of the current picture are determined as allowed to be divided into the slice chunks:
determine whether a current slice of the current picture is to be delivered as multiple current slice chunks according to at least a second syntax element in a slice header of a current slice of the current picture provided in the bitstream;
in response to the current slice being determined to be delivered as the multiple current slice chunks,
obtain sizes and positions of the multiple current slice chunks of the current slice according to information provided in the slice header of the current slice,
obtain pieces of chunk data of the multiple current slice chunks respectively delivered in separate transmission data units, and
reconstruct the current slice based on the pieces of chunk data of the multiple current slice chunks and the sizes and the positions of the multiple current slice chunks; and
in response to the current slice being determined not to be delivered as the multiple current slice chunks,
obtain slice data of the current slice delivered in a single transmission data unit, and
reconstruct the current slice based on the slice data of the current slice.

13. The video encoding method of claim 11, wherein each one of the separate transmission data units or the single transmission data unit is a Network Abstraction Layer (NAL) unit.

14. The electronic apparatus of claim 12, wherein each one of the separate transmission data units or the single transmission data unit is a Network Abstraction Layer (NAL) unit.

* * * * *